(12) United States Patent
Iritani et al.

(10) Patent No.: US 9,434,194 B2
(45) Date of Patent: Sep. 6, 2016

(54) INK JET RECORDING APPARATUS AND INK JET RECORDING SYSTEM USING PIXEL DIVISION PATTERNS

(75) Inventors: Hinako Iritani, Kawasaki (JP); Yuji Konno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 12/619,935

(22) Filed: Nov. 17, 2009

(65) Prior Publication Data

US 2010/0123749 A1 May 20, 2010

(30) Foreign Application Priority Data

Nov. 20, 2008 (JP) .................................. 2008-296693

(51) Int. Cl.
| | | |
|---|---|---|
| G06K 1/12 | (2006.01) | |
| B41J 29/38 | (2006.01) | |
| B41J 2/175 | (2006.01) | |
| B41J 2/21 | (2006.01) | |
| B41J 29/02 | (2006.01) | |
| G06K 15/10 | (2006.01) | |

(52) U.S. Cl.
CPC ............ B41J 29/38 (2013.01); B41J 2/17566 (2013.01); B41J 2/2132 (2013.01); B41J 29/02 (2013.01); G06K 15/107 (2013.01)

(58) Field of Classification Search
None
See application file for complete search history.

(56) References Cited

U.S. PATENT DOCUMENTS

| | | | |
|---|---|---|---|
| 5,633,663 A * | 5/1997 | Matsubara et al. ............. 347/41 |
| 5,638,188 A * | 6/1997 | Moro et al. .................. 358/3.03 |
| 6,154,568 A * | 11/2000 | Chen et al. .................... 382/232 |
| 6,164,745 A * | 12/2000 | Nagoshi et al. ................ 347/15 |
| 7,198,345 B2 * | 4/2007 | Shibata et al. .................. 347/15 |
| 7,204,572 B2 * | 4/2007 | Seki et al. ...................... 347/16 |
| 7,261,388 B2 * | 8/2007 | Vega et al. ...................... 347/15 |
| 7,303,247 B2 * | 12/2007 | Maru et al. ..................... 347/15 |
| 7,396,098 B2 * | 7/2008 | Kanematsu et al. ............ 347/15 |
| 7,562,956 B2 * | 7/2009 | Yamazaki et al. .............. 347/14 |
| 7,578,570 B2 * | 8/2009 | Seki et al. ...................... 347/16 |
| 7,588,306 B2 * | 9/2009 | Masuyama et al. ........... 347/14 |
| 7,901,025 B2 * | 3/2011 | Kato et al. ...................... 347/15 |
| 7,914,102 B2 * | 3/2011 | Imai ...................... B41J 2/5056 347/15 |
| 8,272,712 B2 * | 9/2012 | Imai ...................... B41J 2/5056 347/19 |
| 8,740,351 B2 * | 6/2014 | Tsuboi et al. ................... 347/43 |
| RE45,358 E * | 2/2015 | Marumoto ..................... 347/14 |
| 8,947,738 B2 * | 2/2015 | Shibasaki et al. ........... 358/3.24 |
| 2005/0073535 A1 * | 4/2005 | Seki et al. ......................... 347/5 |
| 2005/0116978 A1 * | 6/2005 | Kubota ........................... 347/19 |
| 2005/0219294 A1 | 10/2005 | Nakazawa et al. |
| 2006/0044338 A1 * | 3/2006 | Maru et al. ..................... 347/15 |
| 2007/0153041 A1 * | 7/2007 | Seki et al. ...................... 347/14 |
| 2007/0153046 A1 * | 7/2007 | Kanematsu et al. ............ 347/19 |
| 2008/0158280 A1 * | 7/2008 | Imai ..................... G06K 15/107 347/15 |
| 2008/0239337 A1 * | 10/2008 | Marumoto ..................... 358/1.8 |
| 2010/0123749 A1 * | 5/2010 | Iritani et al. ................... 347/14 |
| 2011/0141185 A1 * | 6/2011 | Imai ...................... B41J 2/5056 347/19 |
| 2011/0242176 A1 * | 10/2011 | Iritani et al. ................... 347/15 |
| 2012/0050362 A1 * | 3/2012 | Iritani et al. ..................... 347/9 |
| 2012/0313992 A1 * | 12/2012 | Wada et al. .................... 347/15 |

FOREIGN PATENT DOCUMENTS

| | | |
|---|---|---|
| JP | 2005-297212 A | 10/2005 |
| JP | 2006-062332 A | 3/2006 |
| JP | 2008-162095 A | 7/2008 |

* cited by examiner

Primary Examiner — Andrew Jordan
(74) Attorney, Agent, or Firm — Canon U.S.A., Inc. IP Division

(57) ABSTRACT

An ink jet recording apparatus that executes ink jet recording based on multi-pass recording and that achieves a high glossiness and a low granularity is provided. Based on information corresponding to an ink discharge amount, distribution and concentration masks are selected for low and high duty areas of a recorded image, respectively.

15 Claims, 14 Drawing Sheets

FIG. 9A

| 1 | 3 | 2 | 4 |
|---|---|---|---|
| 2 | 4 | 3 | 1 |
| 3 | 1 | 4 | 2 |
| 4 | 2 | 1 | 3 |

FIG. 9B

| 1 | 1 | 3 | 3 |
|---|---|---|---|
| 1 | 1 | 3 | 3 |
| 2 | 2 | 4 | 4 |
| 2 | 2 | 4 | 4 |

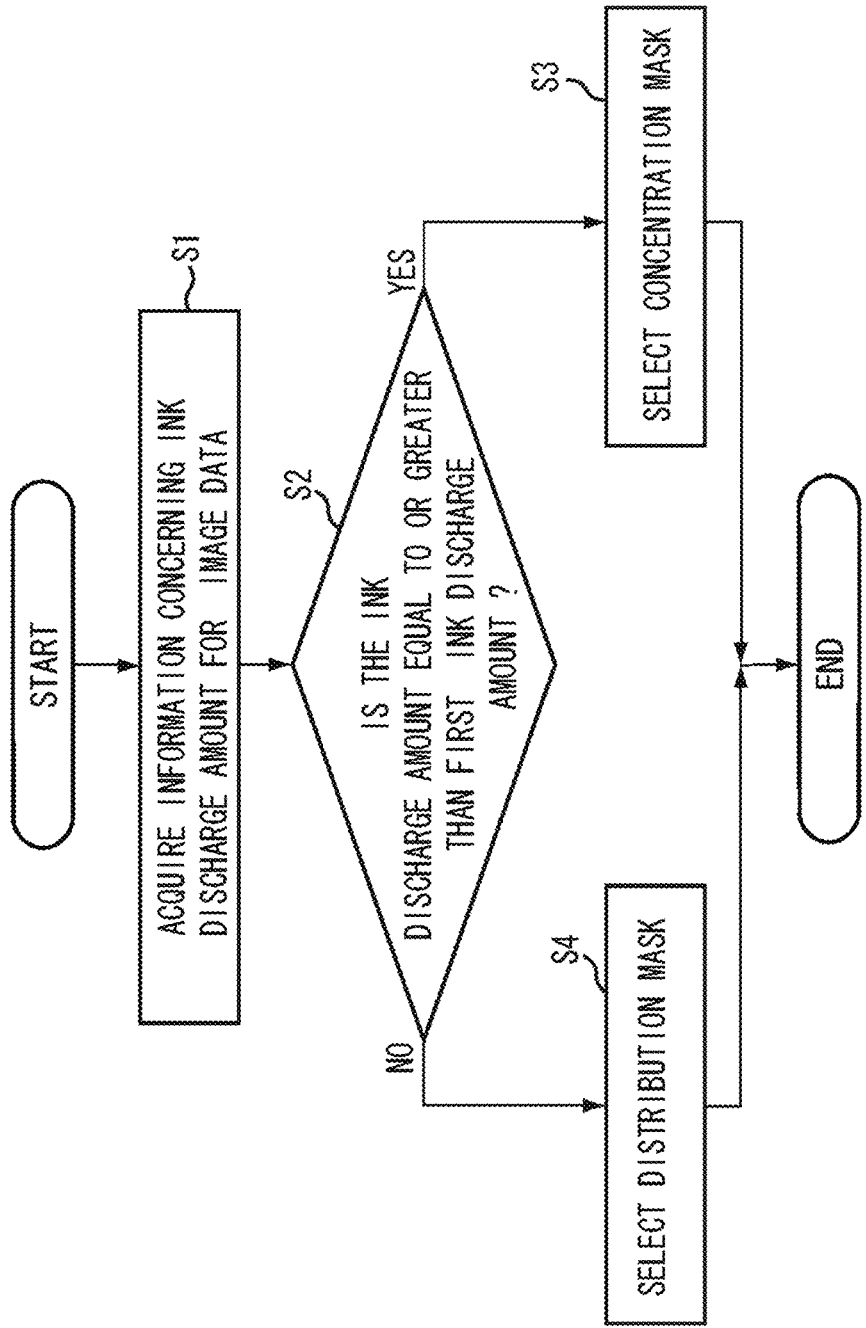

FIG. 11C LEVEL 0
FIG. 11D LEVEL 4
FIG. 11E LEVEL 8
FIG. 11F LEVEL 12
FIG. 11G LEVEL 16

FIG. 14A

GRADATION VALUE INFORMATION

| 1 | 8 | 2 | 12 | 13 | 9 |
|---|---|---|----|----|---|
| 3 | 4 | 10 | 0 | 15 | 11 |

FIG. 14B

MASK PATTERN

| A | A | A | B | B | A |
|---|---|---|---|---|---|
| A | A | B | A | B | B |

FIG. 14C

| A | A | A | A | B | B |
|---|---|---|---|---|---|
| A | A | A | A | B | B |

INK JET RECORDING APPARATUS AND INK JET RECORDING SYSTEM USING PIXEL DIVISION PATTERNS

BACKGROUND OF THE INVENTION

1. Field of the Invention

The present invention relates to an inkjet recording apparatus and an ink jet recording system that can carry out multi-pass recording, in which an image is recorded on a unit area of a recording medium during a plurality of operations of a recording head.

2. Description of the Related Art

Conventionally, multi-pass recording is widely known as a technique for recording an image on a single recording area of a recording medium during a plurality of operations of a recording head. Conventionally, such multi-pass recording reduces deterioration in image quality caused by variation in the amount of ink discharged by each recording nozzle of the recording head. The multi-pass recording utilizes a mask pattern as a division pattern for dividing image data corresponding to a single recording area into image data corresponding to a plurality of operations of the recording head. As examples of such mask pattern, the following mask patterns are known.

For example, FIGS. 6B and 6C of Japanese Patent Application Laid-Open No. 2005-297212 illustrate mask patterns in which recordable pixels are narrowly and widely distributed, respectively. Hereinafter, a mask pattern in which recordable pixels are widely distributed is referred to as a distribution mask, and a mask pattern in which recordable pixels are narrowly distributed is referred to as a concentration mask.

Meanwhile, the granularity of ink dots is a factor that determines the quality of an image recorded by the ink jet recording. Since the surface of a recording medium is covered with dots in high duty areas of an image, the granularity of dots is rarely problematic. However, since dots are easily noticeable on the surface of a recording medium in low duty areas of an image, the granularity is easily increased. Thus, conventionally, the multi-pass recording utilizes a distribution mask to reduce the granularity.

In recent years, with increased demand for further improvement in light or water resistance of a recording medium, ink using pigment as a color material has been developed. However, regarding such pigment ink, since color material does not easily penetrate into the inner part of a recording medium, the evenness of the surface is decreased, and the glossiness of the image is thus decreased. Particularly, this decrease in the glossiness can be significant in the multi-pass recording, and the reasons will be described below with reference to FIGS. 7A to 7F.

FIGS. 7E to 7F illustrate adjacent ink dots recorded by a single scanning and recording operation (also referred to as a recording pass). An ink dot discharged from a recording head is composed of pigment, solvent, and moisture. After applied to the surface of a recording medium, while the moisture and the solvent are absorbed by the recording medium, the pigment remains on the surface of the recording medium, as illustrated in FIG. 7F. When adjacent ink dots are recorded at the same recording pass, the ink dots are applied with almost no time lag. Thus, the dots come into contact with each other on the recording medium, and the pigment remains on the surface of the recording medium. Since the unevenness of the surface is small in this case, a decrease in the glossiness of the image is small.

In contrast, FIGS. 7A to 7D illustrate adjacent ink dots each recorded at a different recording pass. When adjacent ink dots are recorded at different recording passes, since the ink dots are applied with a time lag, the dots applied first and next overlap each other.

In this case, as illustrated in FIG. 7D, the pigment remains on the surface unevenly, and the glossiness of the image is decreased. Particularly, when a larger amount of ink is used, more dots overlap one another. Thus, the evenness of the surface is further decreased, and the glossiness is accordingly decreased further. Namely, the glossiness is more likely to be decreased in high duty areas than in low duty areas.

To solve the problem of a decrease in the glossiness in the multi-pass recording, a method using a concentration mask has been known (Japanese Patent Application Laid-Open No. 2005-297212). The method will be described with reference to FIGS. 8A to 8D and FIGS. 9A and 9B.

FIGS. 8A to 8D schematically illustrate surfaces of a high duty area of a recording medium on which an image is recorded by four recording passes. FIGS. 8A to 8C schematically illustrate dots discharged by using a distribution mask of FIG. 9A, and FIG. 8D schematically illustrates dots discharged by using a concentration mask of FIG. 9B. When the distribution mask of FIG. 9A is used, as illustrated in FIG. 8C, ink dots discharged at different passes and are then overlapped with each other, exhibiting a large unevenness. In contrast, when the concentration mask of FIG. 9B is used, as illustrated in FIG. 8D, since dots are discharged at a single pass and are then located adjacent to one another, the unevenness of the surface is small.

As described with reference to FIGS. 7A to 7F, if the surface evenness is higher, the recording medium maintains a higher glossiness. Thus, while use of a distribution mask decreases the glossiness, use of a concentration mask allows the recording medium to maintain a high glossiness.

Based on this knowledge, the method discussed in Japanese Patent Application Laid-Open No. 2005-297212 utilizes the concentration mask when recording an image on a recording medium with a high glossiness and utilizes the distribution mask when recording an image on a recording medium with a low glossiness. However, in the case of a recording medium having glossiness such as glossy paper, the method discussed in Japanese Patent Application Laid-Open No. 2005-297212 cannot solve both of the problems relating to the glossiness and the granularity together.

As described above, a different duty poses a different problem in the ink jet recording. Namely, since both low duty areas and high duty areas are processed with an identical mask according to the above method, the glossiness cannot be improved while maintaining the granularity of an image at a low level.

SUMMARY OF THE INVENTION

The present invention is directed to an ink jet recording apparatus and an ink jet recording system that can achieve both a low granularity in low duty areas of an image and a high glossiness in high duty areas of the image.

According to an aspect of the present invention, an ink jet recording apparatus including a recording head configured to move a plurality of times over a unit area of a recording medium and discharge ink to record an image on the unit area includes a selection unit configured to select a division pattern for dividing image data to be recorded on the unit area into image data to be recorded by each of the plurality of movements of the recording head, based on information corresponding to an amount of ink to be discharged to the unit area, wherein when the amount of ink to be discharged to the unit area is equal to or greater than a first ink discharge amount, the selection unit selects a first division pattern, and when the ink discharge amount corresponding to the information is less than a second ink discharge amount, which is less than the first ink discharge amount, the selection unit selects a second division pattern, which has a smaller number of recordable pixels adjacent to each other, compared with the first division pattern.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 9A and 9B illustrate a plurality of mask patterns according to the first exemplary embodiment.

FIG. 10 is a flow chart illustrating an operation of a characteristic feature of the first exemplary embodiment.

FIGS. 14A to 14C illustrate a fourth exemplary embodiment.

DESCRIPTION OF THE EMBODIMENTS

Various exemplary embodiments, features, and aspects of the invention will be described in detail below with reference to the drawings.

Figure 1:
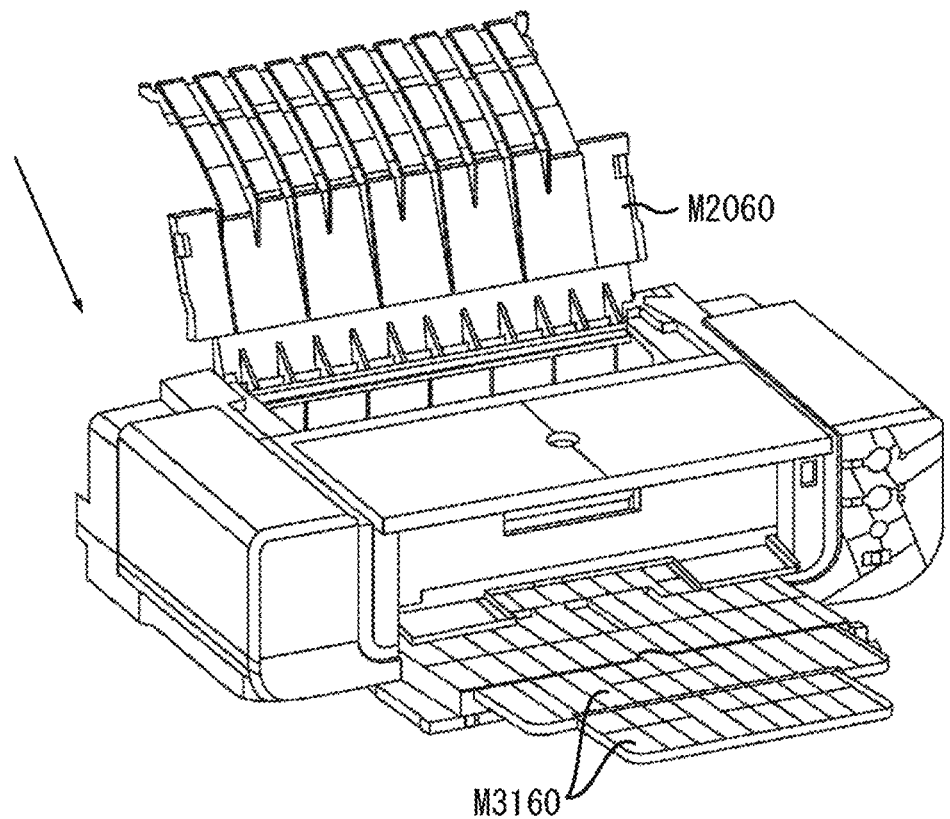
FIG. 1 is a perspective view illustrating an appearance of an ink jet recording apparatus.
Figure 2:
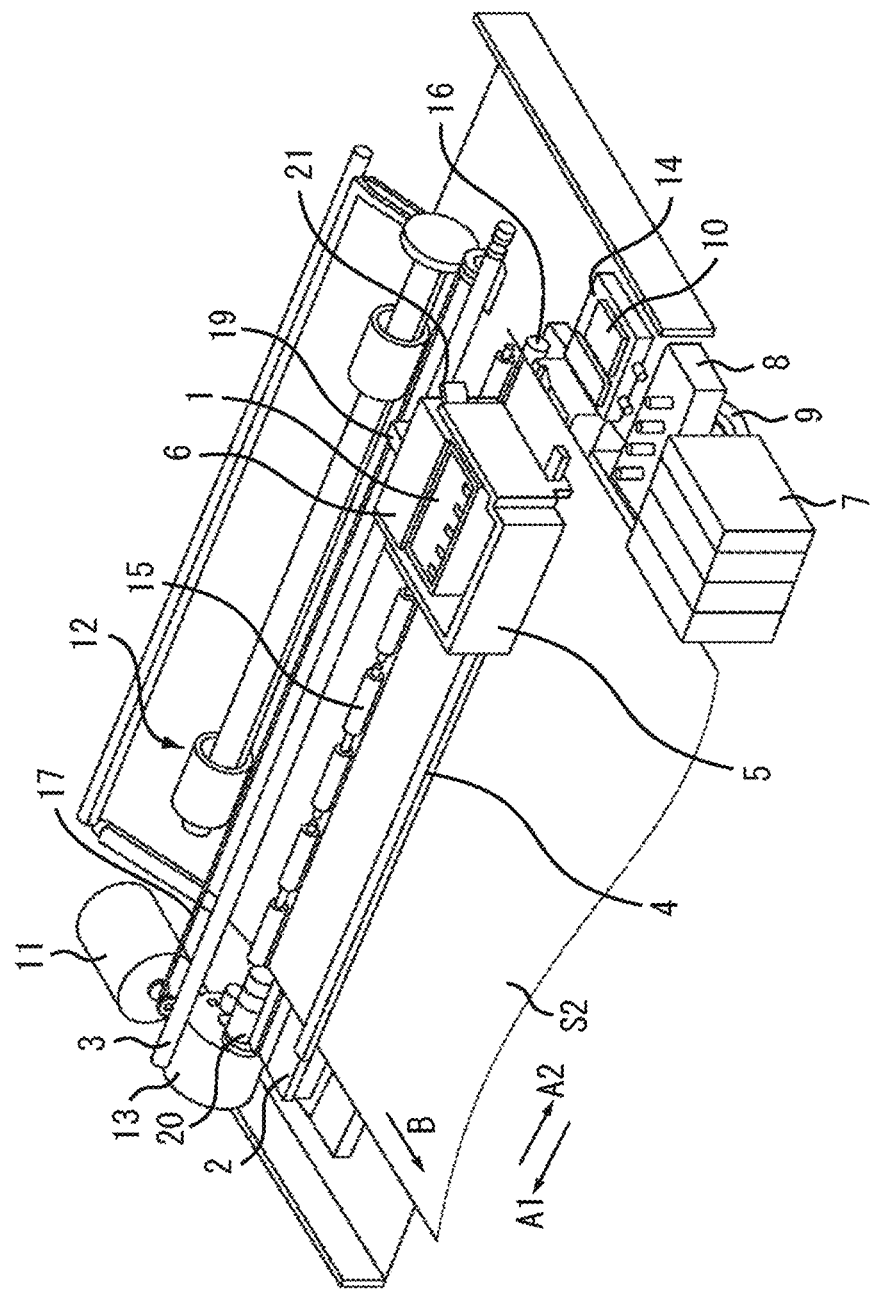
FIG. 2 is a perspective view illustrating an internal structure of the ink jet recording apparatus.

FIG. 1 is a perspective view illustrating the appearance of an ink jet recording apparatus according to the present exemplary embodiment, and FIG. 2 is a perspective view illustrating an internal structure of the ink jet recording apparatus.

In the present exemplary embodiment, a recording medium fed from a paper feed tray 12 in a direction indicated by an arrow is conveyed intermittently, an image is formed on the intermittently conveyed recording medium, and the recording medium on which the image has been formed is discharged from a discharge tray M3160.

A recording head 1 mounted on a carriage 5 reciprocates along a guide rail 4 in the directions of arrows A1 and A2. During the movement, the recording head 1 discharges ink from its nozzles to form an image on a recording medium S2. The recording head 1 has a plurality of nozzle groups corresponding to ink of different colors. For example, the nozzle groups discharge ink of ten colors such as cyan (C), light cyan (LC), magenta (M), light magenta (LM), yellow (Y), red (R), green (G), first black (K1), second black (K2), and gray (Gray).

In FIG. 2, the recording head 1 includes ink of four colors. An ink tank (not illustrated) stores the ink of each of these colors and supplies the ink to the recording head 1. In the present exemplary embodiment, the ink tank and the recording head 1 are integrated to form a head cartridge 6, which is mounted on the carriage 5.

A timing belt 17 transmits driving force of a carriage motor 11 to the carriage 5, and the driving force causes the carriage 5 to perform reciprocating movement along a guide shaft 3 and the guide rail 4 in the directions of the arrows A1 and A2 (main scanning direction). The carriage 5 includes an encoder sensor 21 for detecting the position of the carriage 5. When the carriage 5 moves, the encoder sensor 21 detects the position of the carriage 5 by reading a linear scale 19 installed in the direction in which the carriage 5 moves.

Based on this reciprocating movement, recording on the recording medium is started. When recording, the recording medium S2 is supplied from the paper feed tray 12, sandwiched between a conveyance roller 16 and a pinch roller 15, and conveyed to a platen 2.

After the carriage 5 completes one scanning and recording operation in the A1 direction, a conveyance motor 13 drives the conveyance roller 16 via a linear wheel 20, and the conveyance roller 16 conveys the recording medium S2 by a certain length in the direction of the arrow B (sub scanning direction).

Subsequently, the carriage 5 executes another scanning and recording operation in the A2 direction to perform recording on the recording medium S2. A head cap 10 and a recovery unit 14 mounted at the home position as illustrated in FIG. 1 intermittently execute recovery processing for the recording head 1 as needed.

When recording on a recording medium is completed by repeating the operation as described above, the recording medium is discharged. In this way, recording on a recording medium is completed.

Figure 3:
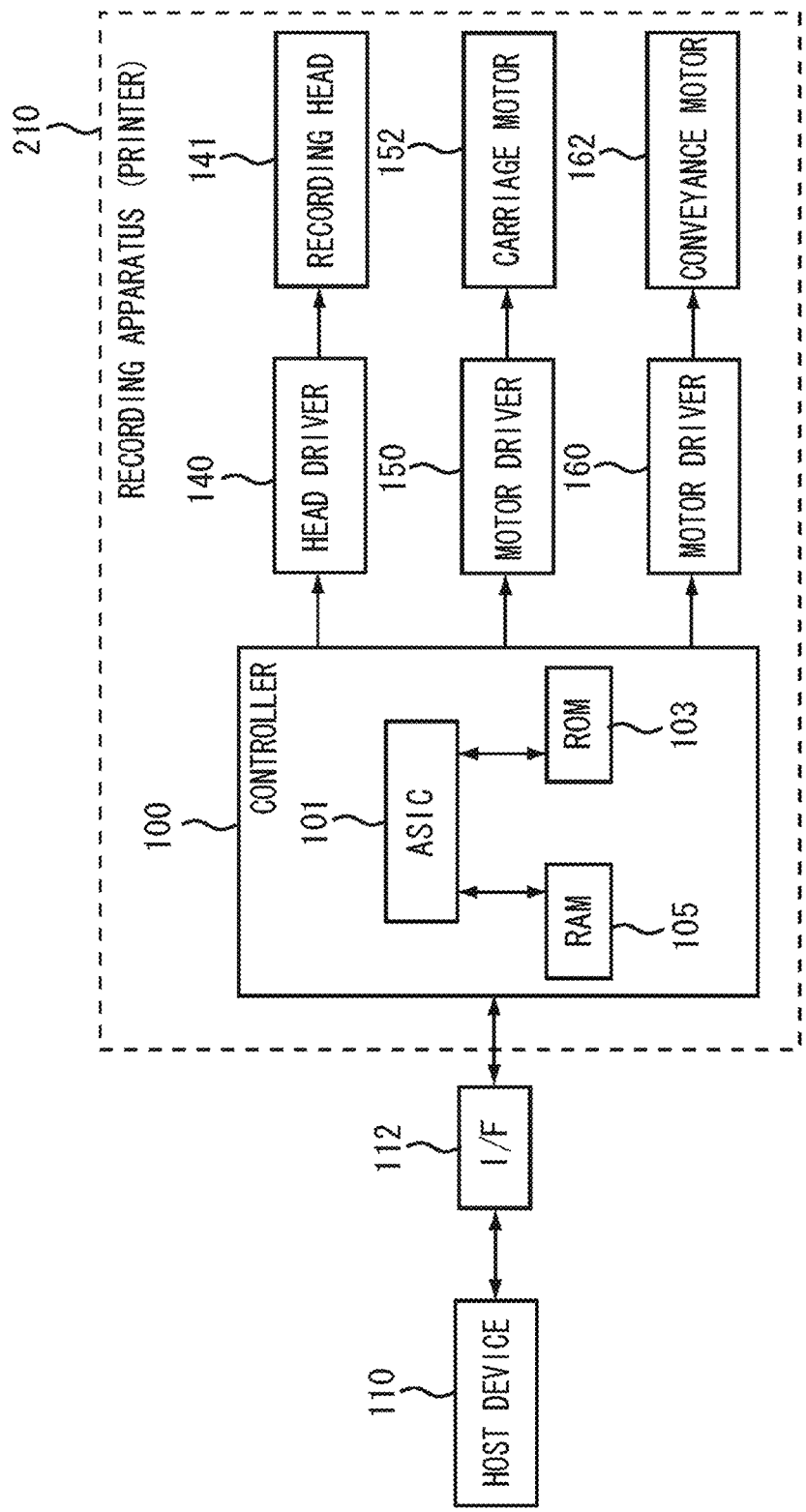
FIG. 3 is an electrical block diagram illustrating a control system in the ink jet recording apparatus according to a first exemplary embodiment

FIG. 3 is a block diagram illustrating a structure of a control unit of the ink jet recording apparatus according to the present exemplary embodiment.

A controller 100 is a main control unit having an application specific integrated circuit (ASIC) 101, a read only memory (ROM) 103, and a random access memory (RAM) 105 in the form of a micro-computer. The ROM 103 stores the program illustrated in FIG. 10, mask patterns illustrated in FIG. 9, and other fixed data. The RAM 105 provides an image-data expansion area and a work area, for example.

The ASIC 101 reads programs from the ROM 103 and executes a series of processing to record an image data on a recording medium. More specifically, the ASIC 101 selects a mask pattern based on information concerning an ink discharge amount, divides an image data, and generates recording data for each pass.

A host device 110 is an image-data supply source and may be a computer, which creates and processes data concerning images to be printed. Alternatively, the host device 110 may be a reader unit for reading images. For example, the host device 110 sends and receives image data and other command and status signals to and from the controller 100 via an interface (I/F) 112.

A head driver 140 drives the recording head 1 based on print data or the like. A motor driver 150 drives the carriage motor 11, and a motor driver 160 drives the conveyance motor 13.

Figure 4:
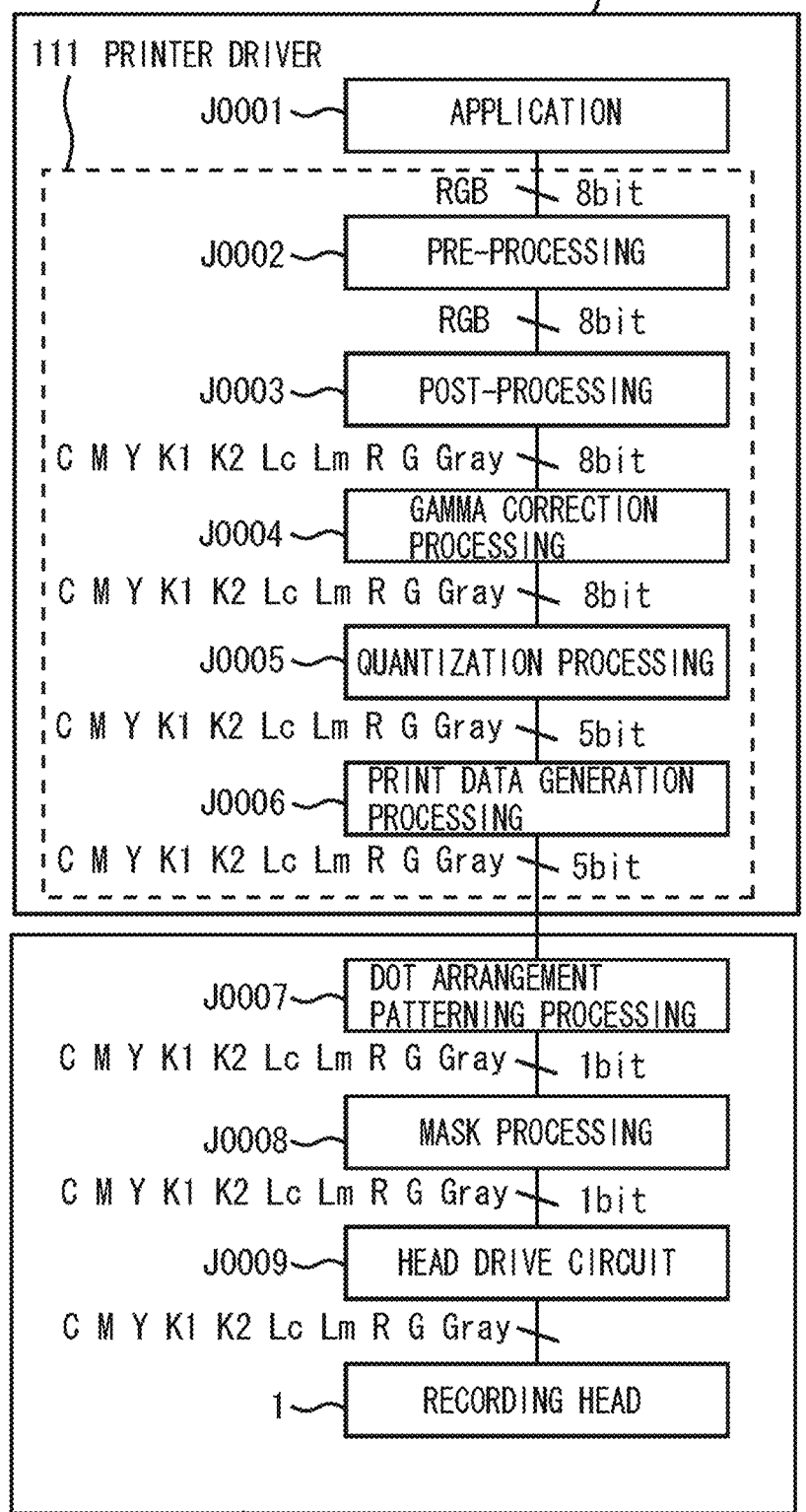
FIG. 4 is a flow chart illustrating an operation of the ink jet recording apparatus according to the first exemplary embodiment.

FIG. 4 is a block diagram illustrating image data conversion processing according to an ink jet recording system of the present exemplary embodiment.

This ink jet recording system is formed by the host device 110 and a recording apparatus (printer) 210. The host device 110 generates data concerning images to be recorded and executes the setting of a user interface (UI) to generate the data, for example.

The recording apparatus (printer) 210 executes recording on a recording medium based on the image data generated by the host device 110. The recording apparatus 210 executes recording by using ink of ten colors C, LC, M, LM, Y, R, G, K1, K2, and Gray, and when recording, the recording head 1 discharges ink of these ten colors. The ink of these ten colors is a pigment ink including pigment as a color material.

Each processing illustrated in FIG. 4 is executed by a personal computer (PC) as the host device 110 and the recording apparatus 210. An application J0001 executes processing for creating image data to be recorded by the printer. When recording is executed, the image data created by the application J0001 is sent to a printer driver 111.

The printer driver 111 executes pre-processing J0002, post-processing J0003, gamma correction processing J0004, quantization processing J0005, and print data generation processing J0006. Next, each processing will be briefly described.

In the pre-processing J0002, gamut mapping is executed. In this processing, data conversion is executed for mapping a color gamut reproduced by sRGB standard image data R, G, and B into a color gamut reproduced by a printer. More specifically, by using a three-dimensional (3D) look-up table (LUT), the image data R, G, and B, each being 256-gradation data represented by 8 bits, is converted into image data R, G, and B data, each being 8 bits and having a different color gamut.

In the post-processing J0003, based on the R, G, and B data on which the above gamut mapping is performed, 8-bit color separation data Y, M, LM, C, LC, K1, K2, R, G, and Gray is determined, so that combinations of the ink reproduce the colors represented by the data. As in the pre-processing, conversion is carried out by using interpolation calculation and the 3D LUT.

In the gamma correction processing J0004, for each of the color separation data obtained by the post-processing J0003, concentration value (gradation value) conversion is carried out. More specifically, conversion is carried out by using a one-dimensional (1D) LUT to linearly associate the above color separation data with gradation characteristics of the printer.

In the quantization processing J0005, a quantization unit executes quantization processing on each of the 8-bit color separation data Y, M, LM, C, LC, K1, K2, R, G, and Gray on which the gamma correction processing has been performed. In the present exemplary embodiment, image data representing each color with 8-bit 256 gradation levels is converted into image data representing each color with 5-bit 17 gradation levels. In this processing, error diffusion processing is used as quantization processing. The data in which each color is quantized to 17 gradation levels is gradation value information indicating any one of the gradation levels 0 to 16.

In the print data generation processing J0006, print control information concerning the recorded image quality, the recording medium type, the print information (color or black and white), and the like is added to the print image information, which is collections of gradation value information, and print data is generated.

When the host device 110 sends the print data to the recording apparatus (printer) 210, the printer executes dot arrangement patterning processing J0007 and mask processing J0008 on the input print data.

Figure 5:
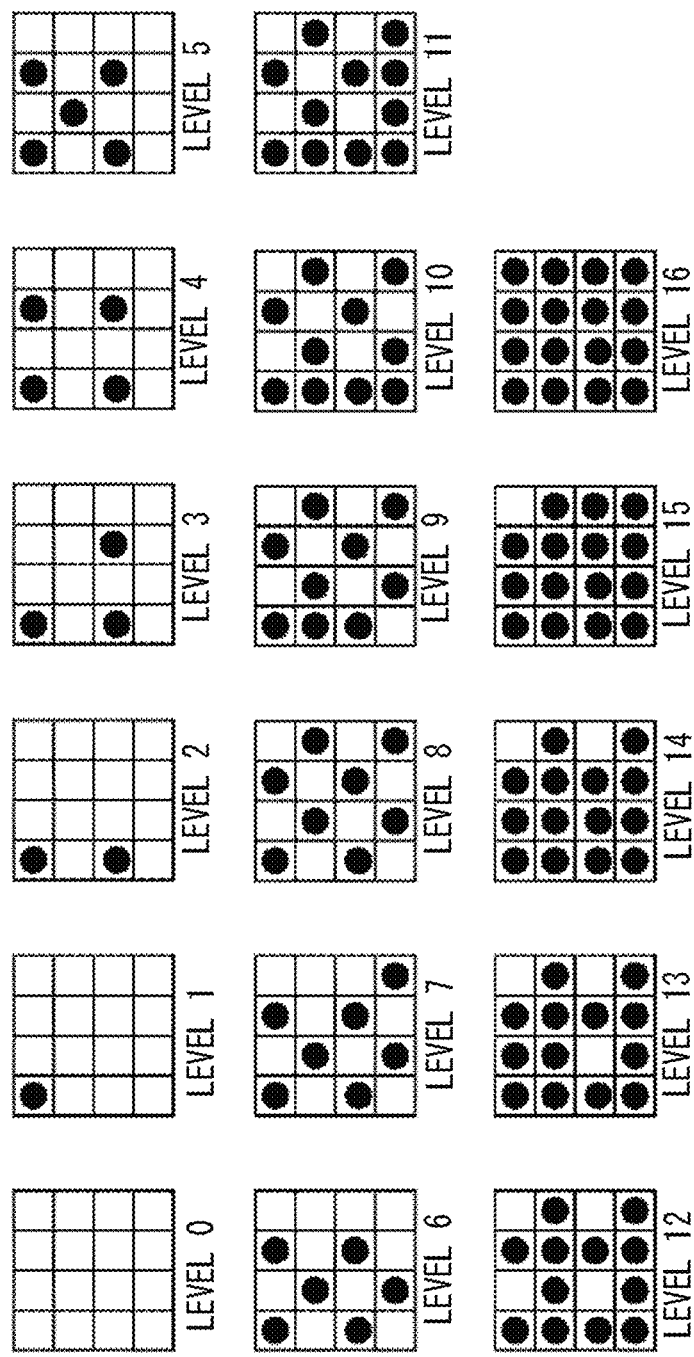
FIG. 5 illustrates dot arrangement patterning processing according to the first exemplary embodiment.

In the dot arrangement patterning processing J0007, binary processing is executed by converting the input 17-gradation-value information into dot arrangement patterns. Thus, binary data that determines whether the printer needs to discharge ink can be obtained. FIG. 5 illustrates dot arrangement patterns corresponding to the 17 gradation levels to be used in the present exemplary embodiment.

In the dot arrangement patterning processing J0007, for each pixel represented by 5-bit data concerning gradation levels 0 to 16 output from the quantization processing J0005, a dot arrangement pattern corresponding to a gradation value (level 0 to level 16) of each pixel is rasterized. In this way, whether an ink dot needs to be recorded or not (discharged or not) in a multi-valued 1 pixel corresponding to a unit area is defined. In this processing, multi-valued (5 bit) 1 pixel data is converted into binary (1 bit) 4×4 pixel data.

Next, in the mask processing J0008, mask processing is performed on the dot arrangement of each color determined by the dot arrangement patterning processing J0007, using a plurality of mask patterns, which are complementary to each other. This mask processing will be described in detail later. In this mask processing, for each of the colors Y, M, Lm, C, Lc, K1, K2, R, G, and Gray, recording data is generated for each of the recording passes of the multi-pass recording.

Next, the recording data is supplied to the head driving circuit J0009 at an appropriate timing during a plurality of recording passes of the multi-pass recording. The recording data supplied to the head driving circuit J0009 is converted into a drive pulse of the recording head 1, and ink of relevant colors is then discharged at a predetermined timing from the recording head 1. As described above, ink is discharged based on recording data, and an image is then recorded on a recording medium.

Next, the multi-pass recording will be described. The multi-pass recording is a method for recording an image on a unit area of a recording medium through a plurality of scanning operations of a recording head.

Figure 6:
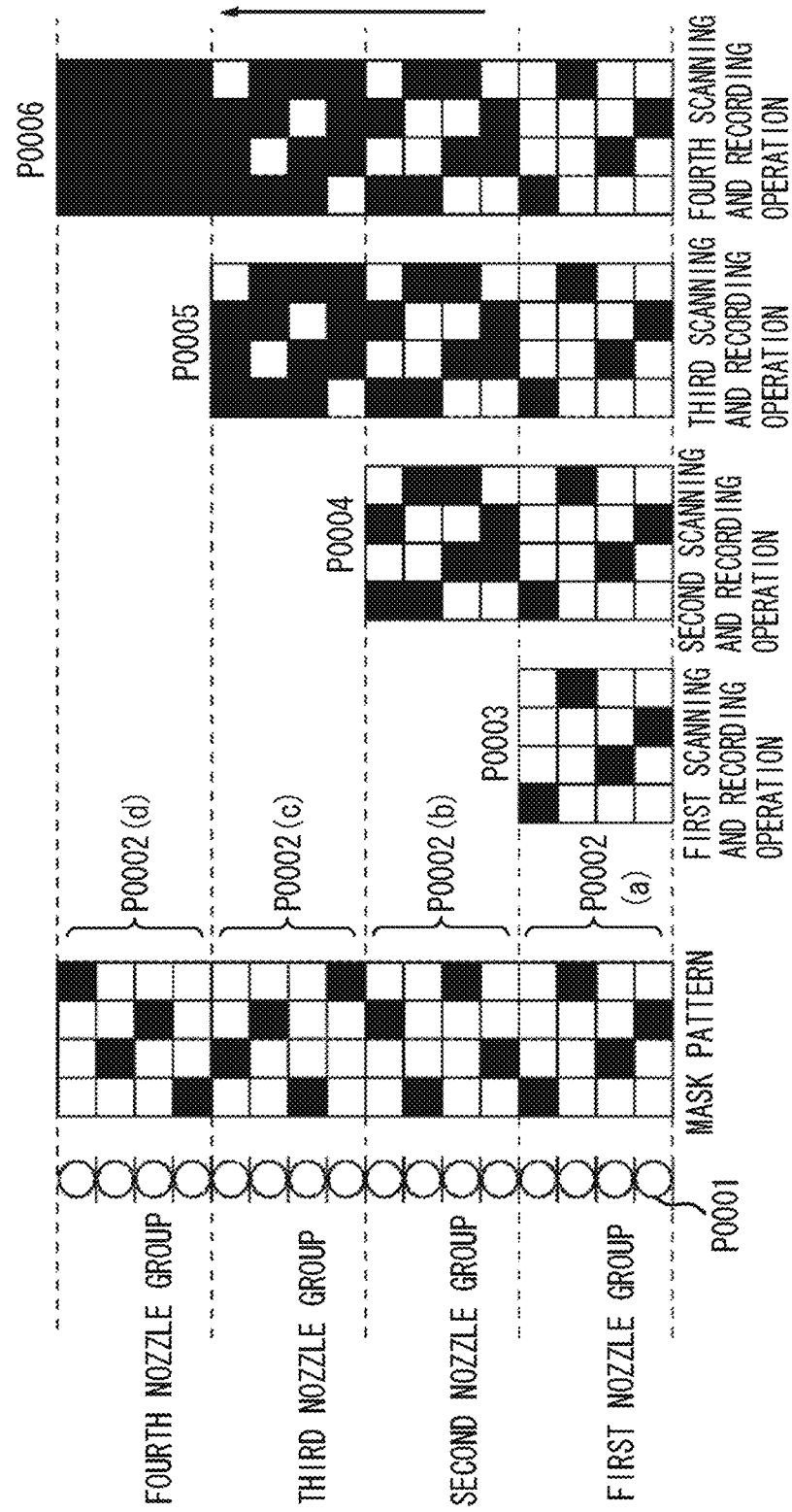
FIG. 6 illustrates multi-pass recording and mask patterns.
Figure 7A:
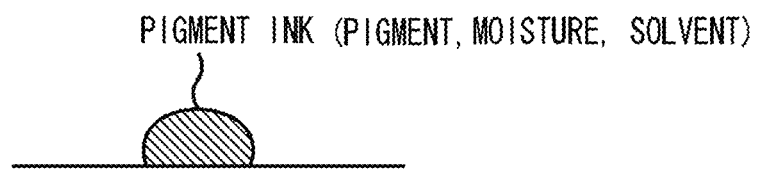
FIGS. 7A to 7F schematically illustrate pigment ink discharged on the surface of a recording medium according to the first exemplary embodiment.
Figure 7B:
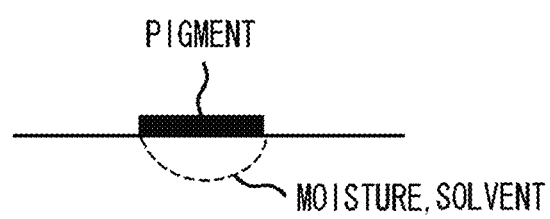
Figure 7C:
Figure 7D:
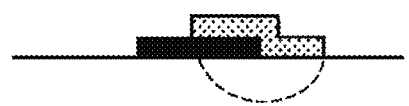
Figure 7E:
Figure 7F:
Figure 8A:
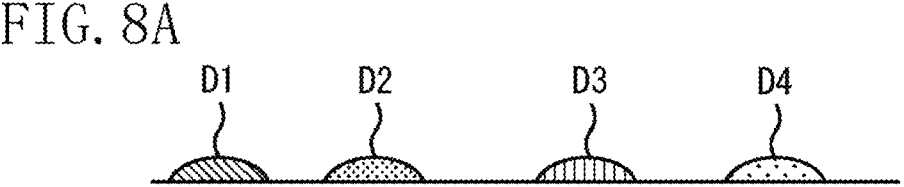
FIGS. 8A to 8D schematically illustrate the pigment ink discharged on the surface of a recording medium according to the first exemplary embodiment.
Figure 8B:
Figure 8C:
Figure 8D:
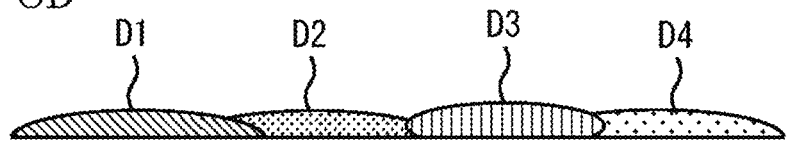

FIG. 6 schematically illustrates an operation of the multi-pass recording. While the recording head 1 of the present exemplary embodiment actually has 768 nozzles, the recording head 1 has only 16 nozzles P0001 in this example for simplicity and forms an image through four scanning and recording operations. The nozzles P0001 are divided into first to fourth nozzle groups, and four nozzles form each of the nozzle groups.

When recording is executed on a unit area through a plurality of scanning operations of a recording head in the multi-pass recording, mask patterns are used as division patterns to divide the image data to be recorded into a plurality of sections. First to fourth mask patterns P0002 (*a*) to P0002 (*d*) form a mask pattern P0002.

The multi-pass recording will be described in FIG. 6, using a mask pattern (distribution mask) as illustrated in FIG. 9(A) in which recordable pixels are widely distributed. The first to fourth mask patterns P0002 (*a*) to P0002 (*d*) define the recordable pixels of the first to fourth nozzle groups, respectively.

In the mask patterns, black areas represent recordable pixels that allow recording of dots, and white areas represent non-recordable pixels that do not allow recording of dots. The first to fourth mask patterns P0002 (*a*) to P0002 (*d*) are complementary to each other, and superposition of these four mask patterns completes recording of a unit area corresponding to 4×4 pixels.

Patterns P0003 to P0006 illustrate how repetition of scanning and recording operations completes recording of an image. Each time a scanning and recording operation completes, a recording medium is intermittently conveyed by the width of a nozzle group (the width of four nozzles in FIG. 6) in the direction indicated by the arrow in FIG. 6. Thus, recording an image on a single recording area (area corresponding to the width of each nozzle group) of a recording medium is completed through four scanning and recording operations.

Through the AND processing based on these mask patterns and binary image data obtained by the above dot arrangement patterning processing, binary recording data to be recorded at each recording pass is determined.

Next, a method for selecting a mask pattern based on information corresponding to the amount of ink discharged on a unit area, which is a characteristic feature of the present invention, will be described in detail. In the present exemplary embodiment, an area corresponding to a multi-valued 1 pixel (binary 4×4 pixels) as described in FIGS. 5 and 6 is referred to as a "unit area." Further, multi-valued image data is used as the information corresponding to the amount of ink discharged on the unit area.

In the present exemplary embodiment, a ratio of the number of ink dots actually recorded to the number of binary pixels forming a unit area is referred to as a "duty." For example, while the image data is represented by 17 gradation levels 0 to 16 as illustrated in FIG. 5 of the present exemplary embodiment, when dots are recorded on all 16 pixels (level 16), the unit area is referred to as 100% duty. When dots are recorded on 8 pixels (level 8), the unit area is referred to as 50% duty.

Next, a distribution mask and a concentration mask, which are division patterns used in the present exemplary embodiment, will be described. As described above, the distribution mask is a mask pattern in which the number of recordable pixels adjacent to each other is less, compared with the concentration mask. When at least one of the eight pixels surrounding a recordable pixel is a recordable pixel, then the recordable pixels adjacent to each other exist.

FIGS. 9A and 9B schematically illustrate the distribution mask and the concentration mask, respectively. As illustrated in FIGS. 9A and 9B, the total number of recording permitted pixels in the division pattern of FIG. 9A and the total number of recording permitted pixels in the division pattern of FIG. 9B are same as each other. In the distribution mask of FIG. 9A, the number of recordable pixels adjacent to each other at the first pass and the second pass is 0. The number of such recordable pixels at the third pass and the fourth pass is 2. In contrast, in the concentration mask of FIG. 9B, the number of recordable pixels adjacent to each other is 4 at all the first to fourth passes. Thus, since recordable pixels of each pass are more narrowly distributed in the concentration mask of FIG. 9B compared with those in the distribution mask of FIG. 9A, the concentration mask is advantageous in obtaining a high glossiness.

Next, when a single mask is set after the quantization irrespective of the duty of image data, and recording is executed using a single mask irrespective of the area for single image data will be described.

When the distribution mask is used, since ink dots discharged at a single pass are separated, each single dot is not noticeable, and as a result, an image with a low granularity can be obtained. However, since adjacent dots are applied with a time lag, the unevenness of the surface is significant, and as a result, the glossiness decreases particularly in high duty areas.

In contrast, when the concentration mask is used, since adjacent dots are discharged with no time lag, the unevenness of the surface caused by overlapping dots is not so significant, and as a result, an image with a high glossiness can be obtained. However, since the apparent dot size is large, the granularity of the image is increased. The granularity is rarely problematic in high duty areas where each single dot is not clearly perceived, but it can easily be problematic in low duty areas.

Thus, if a single mask is used irrespective of the level of duty, both a high glossiness in high duty areas and a low granularity in low duty areas cannot be achieved.

Therefore, the present exemplary embodiment solves the above problems by selecting one of the division patterns, each having a different distribution of recordable pixels, based on the image duty. More specifically, the concentration mask corresponding to a first division pattern is selected for high duty areas of an image, and the distribution mask corresponding to a second division pattern is selected for low duty areas of the image.

The selection of mask patterns will be described in detail with reference to FIG. 10. First, in step S1, based on gradation value information, ink discharge amount information concerning image data is acquired. Next, in step S2, whether the image gradation level is equal to or greater than a first ink discharge amount or less than the first ink discharge amount is determined. If the image gradation level is equal to or greater than the first ink discharge amount (YES in step S2), in step S3, the concentration mask is selected. If the image gradation level is less than the first ink discharge amount (a second ink discharge amount) (NO in step S2), the processing proceeds to step S4, and, in step S4, the distribution mask is selected.

In the present exemplary embodiment, the first ink discharge amount corresponds to level 10 of the gradation value information, which indicates 17 gradation levels 0 to 16 illustrated in FIG. 5. Further, in the present exemplary embodiment, any one of the levels 10 to 16 corresponds to the high duty area, and any one of the levels 0 to 9 corresponds to the low duty area.

Figures 11A, 11B, 11H, 11I, 11J, 11K, 11L:
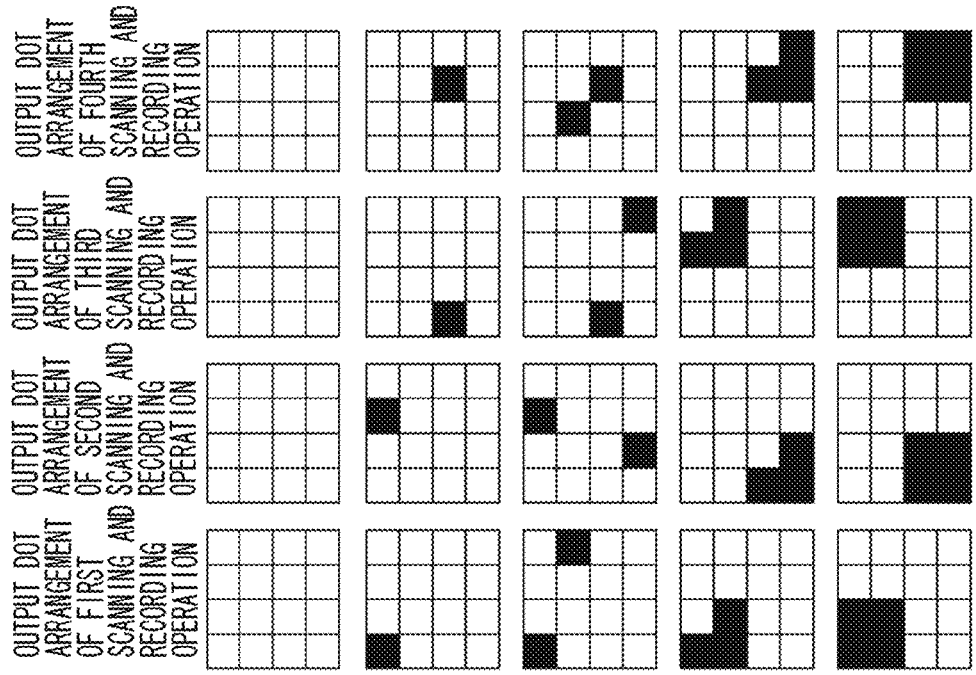
FIG. 11 illustrates a relationship between image data and mask patterns according to the first exemplary embodiment.

FIG. 11 illustrates image data representing the gradation value levels 0, 4, 8, 12, and 16, and the mask processing performed based on each of the gradation value levels will be described referring to FIG. 11. FIG. 11A illustrates the distribution mask pattern, and FIG. 11B illustrates the concentration mask pattern. FIG. 11C to 11G illustrate image data representing the gradation levels 0, 4, 8, 12, and 16, respectively. FIGS. 11H to 11L illustrate output dot arrangements of the scanning and recording operations at the first to fourth passes after performing the mask processing on each of the image data of FIGS. 11C to 11G.

The mask processing is performed on the image data representing the gradation levels 0, 4, and 8 by using the distribution mask, and the mask processing is performed on the image data representing the gradation levels 12 and 16 by using the concentration mask.

The number of passes of the multi-pass recording according to the present exemplary embodiment is not limited to 4. In addition, while a plurality of recording passes complementary to each other is used in the multi-pass recording, the recording passes do not necessarily have to have a complementary relationship. The number of recording passes may be changed depending on the image quality.

Furthermore, while any one of the gradation levels 0 to 9 is determined as the low duty area and any one of the gradation levels 10 to 16 as the high duty area in the above description, the present exemplary embodiment is not limited to this. For example, any one of the gradation levels 0 to 12 and any one of the gradation levels 13 to 16 may be set to be the low duty area and the high duty area, respectively.

Thus, according to the present exemplary embodiment, if an image-data area requires an ink discharge amount equal to or greater than a first ink discharge amount, the concentration mask is selected as a first mask pattern. If an image-data area requires a second ink discharge amount, which is less than the first ink discharge amount, the distribution mask is selected as a second mask pattern. In this way, high-quality images with a reduced image granularity and an improved glossiness can be obtained.

Next, a second exemplary embodiment according to the present invention will be described. Other than characteristic features described below, the second exemplary embodiment is similar to the first exemplary embodiment. While the distribution and concentration masks as illustrated in FIG. 9 have been described as examples in the first exemplary embodiment, masks to be selected are not limited to these. For example, masks as illustrated in FIG. 12 may be used.

Figure 12A:
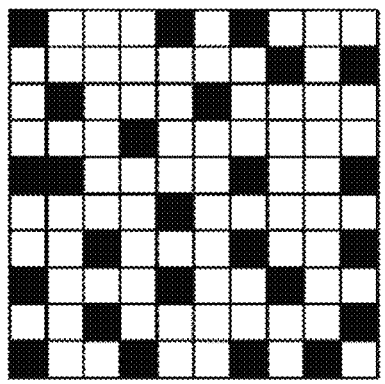
FIGS. 12A and 12B illustrate a second exemplary embodiment.
Figure 12B:
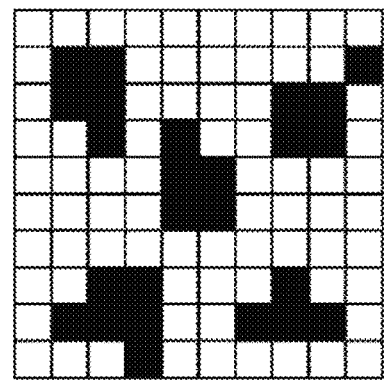

FIGS. 12A and 12B show another example of the distribution mask and the concentration mask, respectively. Each of these masks illustrates one of the four recording passes in an area of 10×10 pixels, and the number of recordable pixels of these masks is the same. In other words, the total number of recording permitted pixels in the division pattern of FIG. 12A and the total number of recording permitted pixels in the division pattern of FIG. 12B are same as each other.

FIG. 12A illustrates the distribution mask in which the number of recordable pixels adjacent to each other is 10. FIG. 12B illustrates the concentration mask in which the number of recordable pixels adjacent to each other is 25. It is seen that the concentration mask of FIG. 12B has a greater number of recordable pixels adjacent to each other, compared with the distribution mask of FIG. 12A.

Similarly to the first exemplary embodiment, by selecting the concentration mask for high duty areas of image data and the distribution mask for low duty areas, both a high glossiness and a low granularity can be obtained.

Next, a third exemplary embodiment according to the present invention will be described. Other than characteristic features described below, the third exemplary embodiment is similar to the first exemplary embodiment. In the present exemplary embodiment, while the concentration mask and the distribution mask have the same number of recordable pixels adjacent to each other, the size of a cluster of adjacent pixels is different between the masks.

Figure 13B:
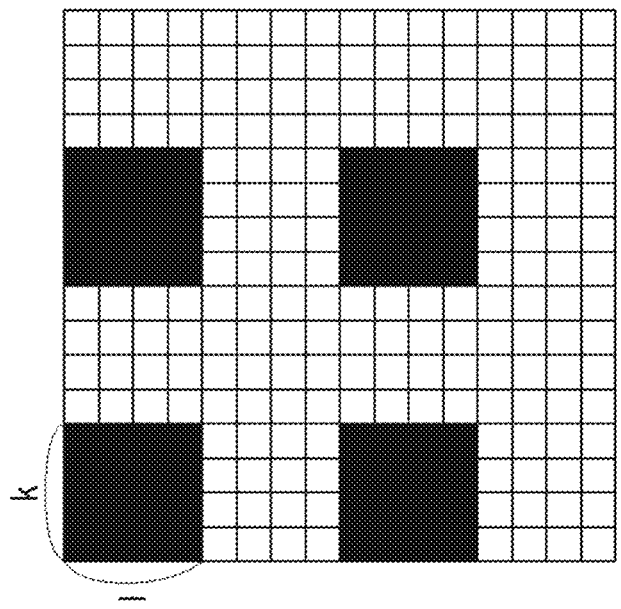
FIGS. 13A and 13B illustrate a third exemplary embodiment.
Figure 13A:
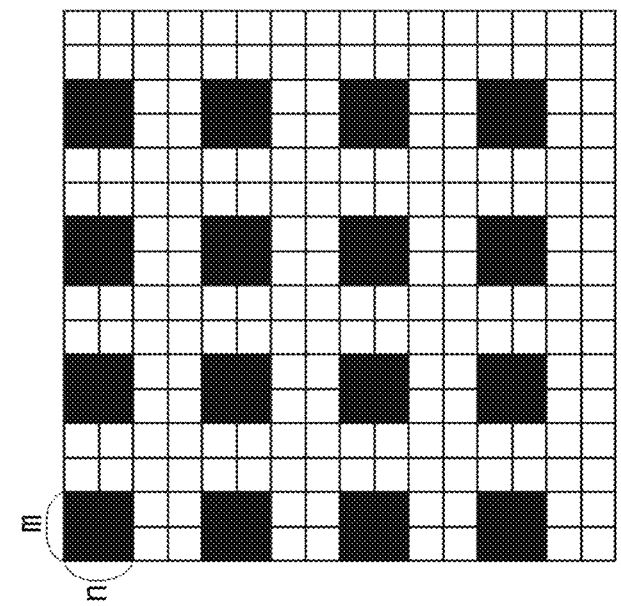

FIG. 13 illustrates examples of mask patterns according to the present exemplary embodiment. FIG. 13A illustrates a distribution mask, and FIG. 13B illustrates a concentration mask.

While both of the masks have the same number of recordable pixels adjacent to each other (64 pixels in FIG. 13), the size of each cluster greatly differs. In FIG. 13A, clusters of 2×2 pixels are arranged, and in FIG. 13B, clusters of 4×4 pixels are arranged. Thus, recordable pixels are differently distributed.

In the present exemplary embodiment, the distribution mask includes clusters each formed of m×n pixels and the concentration mask includes clusters each formed of k×l pixels. Each of the letters m, n, k, and l represents an integer, and it is only necessary that either m or n and either k or l be 2 or greater.

If the number of recordable pixels adjacent to each other is the same between the distribution mask and the concentration mask, when the relationship k×l>m×n is satisfied, the m×n cluster mask is determined as a distribution mask and the k×l cluster mask to be a concentration mask. In this way, as described above, both the granularity and the glossiness of an image can be improved simultaneously.

Next, a fourth exemplary embodiment according to the present invention will be described. Other than characteristic features described below, the fourth exemplary embodiment is similar to the first exemplary embodiment. In the first exemplary embodiment, a multi-valued 1 pixel is used as a unit area, and a mask is selected from among two masks based on the duty. However, the size of a unit area is not limited to 4×4 pixels. In the present exemplary embodiment, multi-valued 2×2 pixels are used as a unit area, and a mask is selected.

FIG. 14A to 14C illustrate gradation value information concerning multi-valued image data and mask patterns corresponding to the information. FIG. 14A illustrates 17-gradation-value information concerning the image data, FIG. 14B illustrates the mask pattern selection method according to the first exemplary embodiment, and FIG. 14C illustrates a mask pattern selection method according to the present exemplary embodiment. The present exemplary embodiment will be described in detail below.

In the first exemplary embodiment, the dot arrangement patterning processing J0007 receives image data and converts a multi-valued (5 bit) 1 pixel into binary (1 bit) 4×4 pixels. A mask pattern is selected for each of the multi-valued 1 pixel data, and mask processing is then executed. Further, as illustrated in FIG. 14A, when the gradation level is between 0 and 9, the distribution mask (denoted by A in the figure) is selected, and when the gradation level is between 10 and 16, the concentration mask (denoted by B in the figure) is selected.

In contrast, in the present exemplary embodiment, a mask pattern is selected based on an average value of the gradation values of multi-valued 2×2 pixel data. For example, an average value of the gradation values of multi-valued 2×2 pixel data illustrated in FIG. 14A is obtained. If the average value is between 0 and 9, the distribution mask (denoted by A in the figure) is selected, and if the average value is between 10 and 16, the concentration mask (denoted by B in the figure) is selected.

Since the average value of the gradation values (1, 3, 8, and 4) of the left 2×2 pixels in FIG. 14A is 4, the distribution mask A is selected for all of these four pixels, and the mask processing is then executed. Similarly, since the average value of the gradation values (2, 10, 12, and 0) is 6, the distribution mask A is selected for these four pixels. However, since the average value of the gradation values (13, 15, 9, and 11) of the right 2×2 pixels is 12, the concentration mask B is selected for these four pixels, and the mask processing is then executed.

Thus, a unit area for which a mask pattern is selected may include a plurality of multi-valued gradation value data. In the present exemplary embodiment, gradation value data concerning multi-valued 2×2 pixels is used as a unit area, and a mask pattern is selected based on an average value of the gradation values of the unit area. However, the unit area is not limited to multi-valued 2×2 pixels.

As long as the mask processing is executed on a plurality of multi-valued pixels used as a unit area, other mask selection methods may be used, instead of the above method using an average value of the gradation values. For example, a mask pattern may be selected based on the sum of a plurality of gradation values.

Next, a fifth exemplary embodiment according to the present invention will be described. Other than characteristic features described below, the fifth exemplary embodiment is similar to the first exemplary embodiment. In the first exemplary embodiment, multi-valued gradation value information obtained after quantization is used as information corresponding to an ink discharge amount, and a mask pattern is selected based on the multi-valued information.

The present exemplary embodiment is not limited to this. For example, multi-valued image data (256-gradation image data) before quantization may be used as the information corresponding to the ink discharge amount. Alternatively, binary image data obtained after the dot arrangement patterning processing may be used as such information.

An example of the method for selecting a mask by counting the pixels on which dots have been discharged after image data is binarized and rasterized will be described. While FIG. 5 illustrates dot arrangement patterns, among the 16 pixels of a unit area, the number of pixels on which ink dots have been discharged is determined.

When the number of dots is between 0 and 9, the area is determined as a low duty area, and when the number of dots is between 10 and 16, the area is determined as a high duty area. A distribution mask is selected for the low duty area, and a concentration mask is selected for a high duty area.

Next, a sixth exemplary embodiment according to the present invention will be described. Other than characteristic features described below, the sixth exemplary embodiment is similar to the first exemplary embodiment.

In the first exemplary embodiment, the gradation level between 0 and 9 corresponds to a low duty area, and the gradation level between 10 and 16 corresponds to a high duty area. In the present exemplary embodiment, based on the dot arrangement patterns in FIG. 5, the gradation level between 0 and 15 corresponds to a low duty area for which a distribution mask is selected, and only the gradation level 16 corresponds to a high duty area for which a concentration mask is selected.

Dots are easily accumulated in 100% duty areas, and the glossiness is easily decreased. In the present exemplary embodiment, by selecting a concentration mask for only an ultra-high duty area where the glossiness may be particularly required, both problems relating to the granularity and the glossiness can be solved.

Next, a seventh exemplary embodiment according to the present invention will be described. Other than characteristic features described below, the seventh exemplary embodiment is similar to the first exemplary embodiment.

While the gradation level between 0 and 9 corresponds to a low duty area and the gradation level between 10 and 16 corresponds to a high duty area in the first exemplary embodiment, an ultra-low duty area of which the gradation level is 0 or 1 will be described below.

Since little ink is discharged on the ultra-low duty area, dots are not noticeable. Thus, the granularity is rarely problematic. Further, since no dot is discharged on an adjacent pixel, the evenness of the medium surface can be maintained. Thus, the glossiness of a recorded image is rarely problematic. Therefore, since neither the granularity nor the glossiness is problematic in the ultra-low duty area, selection of a distribution mask is not essential.

In the above exemplary embodiments, a mask pattern is selected based on two stages depending on information corresponding to an ink discharge amount. On the other hand, according to the present exemplary embodiment, a mask pattern is selected based on three or more stages.

In the following example, the gradation levels are divided into three stages, and high, medium, and low duty areas are set. Based on the dot arrangement patterns of FIG. 5, a concentration mask is selected for a high duty area with the gradation level between 10 and 16, a distribution mask is selected for a medium duty area with the gradation level between 2 and 9, and a concentration mask is selected for a low duty area with the gradation level 0 or 1.

Regarding the low duty area, when the gradation level is 0, no dot is discharged, and when the gradation level is 1, little dot is discharged. Thus, since dots are not discharged adjacently, the glossiness of the surface is rarely problematic. Additionally, since the number of dots is small, the granularity is rarely problematic.

In the present exemplary embodiment, while a concentration mask is selected for the low duty area, either a concentration mask or a distribution mask may be selected for an area where neither the granularity nor the glossiness is problematic.

Thus, while selection is made between a concentration mask and a distribution mask based on the gradation level according to the present invention, a concentration mask is selected for a high duty area where the glossiness can easily be problematic, and a distribution mask is selected for a medium duty area where the granularity can be problematic. However, a mask may be selected based on three or more stages, particularly for the low duty area where neither the granularity nor the glossiness is problematic. Selection of the masks may be made through 3 or more stages.

Further, since little ink is discharged in the low duty area, for the third ink discharge amount, a third division pattern in which the arrangement of recordable pixels is different from the above masks may be selected.

In the above exemplary embodiments, the host device 110 executes the pre-processing J0002, post-processing J0003, gamma correction processing J0004, quantization processing J0005, and print data generation processing J0006, and the recording apparatus (printer) 210 executes the dot arrangement patterning processing J0007 and mask processing J0008. However, the present exemplary embodiment is not limited to this.

For example, instead of the host device 110, the recording apparatus 210 may be configured to execute some of the processing J0002 to J0005. Alternatively, the host device 110 may be configured to execute all the processing. Further alternatively, the ink jet recording system may be configured so that the recording apparatus 210 executes the processing J0002 to J0008.

Further, the present invention is applicable to cases where a software program that realizes the functions of the above exemplary embodiments is directly or remotely supplied to a system or an apparatus, and a computer of the system or the apparatus reads and executes the supplied program code. In the present exemplary embodiment, the above program corresponds to the program illustrated in the flow chart of FIG. 10.

Therefore, program codes installed in a computer for executing the functions and processing of the present invention also realize the present invention. As long as the program function is included, an arbitrary program format may be used, such as an object code, a program executed by an interpreter, and script data supplied to an OS.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-296693 filed Nov. 20, 2008, which is hereby incorporated by reference herein in its entirety.

What is claimed is:

1. An ink jet recording apparatus for recording an image on a unit area of a recording medium by applying ink from a recording head during a plurality of relative scans of the recording head and the unit area based on a plurality of pieces of recording data, the ink jet recording apparatus comprising:
   a memory configured to store a plurality of division patterns, each having recording permitted pixels which are permitted to be recorded with ink and recording non-permitted pixels which are not permitted to be recorded with ink, the plurality of division patterns at least including (i) a first division pattern, and (ii) a second division pattern having a smaller number of recording permitted pixels adjacent to another recording permitted pixel than the first division pattern, wherein a total number of recording permitted pixels in the second division pattern and a total number of recording permitted pixels in the first division pattern are same as each other;
   an acquisition unit configured to acquire information indicating an amount of ink to be applied to the unit area during the plurality of the relative scans;
   a selection unit configured to select one of the plurality of division patterns stored in the memory based on the information acquired by the acquisition unit, wherein the selection unit (i) selects the first division pattern in a case where the information indicates a first amount, and (ii) selects the second division pattern in a case where the information indicates a second amount which is less than the first amount; and
   a generation unit configured to generate the plurality of pieces of recording data by dividing image data using the division pattern selected by the selection unit.

2. The ink jet recording apparatus according to claim 1, wherein the first division pattern comprises a plurality of first mask patterns corresponding to the plurality of relative scans, and in each of the plurality of first mask patterns, the recording permitted pixels corresponding to each of the plurality of relative scans have a complementary relationship to each other, and
   wherein the second division pattern comprises a plurality of second mask patterns corresponding to the plurality of relative scans, and in each of the plurality of second mask patterns, the recording permitted pixels corresponding to each of the plurality of relative scans have a complementary relationship to each other.

3. The ink jet recording apparatus according to claim 1, wherein a number of the permitting recording pixels adjacent to another permitting recording pixel is 0 in the second division pattern.

4. The ink jet recording apparatus according to claim 1, wherein the selection unit selects the first division pattern from the plurality of division patterns stored in the memory in a case where the information indicates a third amount which is less than the second amount.

5. The ink jet recording apparatus according to claim 1, wherein the selection unit selects the second division pattern from the plurality of division patterns stored in the memory in a case where the information indicates a third amount which is less than the second amount.

6. The ink jet recording apparatus according to claim 1, wherein the memory further stores a third division pattern in which an arrangement of recording permitted pixels is different an arrangement of recording permitted pixels of the first and second division patterns, and
   wherein the selection unit selects the third division pattern from the plurality of division patterns stored in the memory in a case where the information indicates a third amount which is less than the second amount.

7. The ink jet recording apparatus according to claim 1, wherein the ink applied from the recording head contains pigment as a color material.

8. The ink jet recording apparatus according to claim 1, wherein the selection unit selects the first division pattern from the plurality of division patterns stored in the memory in a case where the amount indicated by the information is more than the first amount.

9. The ink jet recording apparatus according to claim 1, wherein the selection unit selects the second division pattern from the plurality of division patterns stored in the memory in a case where the amount indicated by the information is less than the second amount.

10. The ink jet recording apparatus according to claim 1, wherein the selection unit selects (i) the first division pattern in a case where the amount indicated by the information is equal to or more than a threshold value, and selects (ii) the second division pattern in a case where the amount indicated by the information is less than the threshold value.

11. The ink jet recording apparatus according to claim 1, wherein the second division pattern is used for suppressing a granularity of the image to be recorded on the unit area.

12. The ink jet recording apparatus according to claim 1, wherein the first division pattern is used for preventing a glossiness of the image to be recorded on the unit area from being decreased.

13. The ink jet recording apparatus according to claim 1, wherein the acquisition unit acquires the information based on a gradation value of multi-valued data.

14. The ink jet recording apparatus according to claim 13, wherein the selection unit selects (i) the first division pattern in a case where the gradation value is equal to or more than a threshold value, and selects (ii) the second division pattern in a case where the gradation value is less than the threshold value.

15. An ink jet recording method for recording an image on a unit area of a recording medium by applying ink from a recording head during a plurality of relative scans of the recording head and the unit area based on a plurality of pieces of recording data, the ink jet recording method comprising:
   a storing step for storing a plurality of division patterns in a memory, each having recording permitted pixels which are permitted to be recorded with ink and recording non-permitted pixels which are not permitted to be recorded with ink, the plurality of division patterns at least including (i) a first division pattern, and (ii) a second division pattern having a smaller number of recording permitted pixels adjacent to another recording permitted pixel than the first division pattern, wherein a total number of recording permitted pixels in the second division pattern and a total number of recording permitted pixels in the first division pattern are same as each other;

an acquisition step for acquiring information indicating an amount of ink to be applied to the unit area during the plurality of the relative scans;

a selection step for selecting one of the plurality of division patterns stored in the storing step based on the information acquired in the acquisition step, wherein the selection step (i) selects the first division pattern in a case where the information indicates a first amount, and (ii) selects the second division pattern in a case where the information indicates a second amount which is less than the first amount; and a generation step for generating the plurality of pieces of recording data by dividing image data using the division pattern selected in the selection step.

* * * * *